(12) United States Patent
Liu

(10) Patent No.: US 10,072,639 B2
(45) Date of Patent: Sep. 11, 2018

(54) GRAVITY POWER GENERATION DEVICE USING GEOTHERMAL STEAM

(71) Applicant: Wen-Yen Liu, Kaohsiung (TW)

(72) Inventor: Wen-Yen Liu, Kaohsiung (TW)

( * ) Notice: Subject to any disclaimer, the term of this patent is extended or adjusted under 35 U.S.C. 154(b) by 118 days.

(21) Appl. No.: 15/310,252

(22) PCT Filed: May 13, 2014

(86) PCT No.: PCT/CN2014/077379
§ 371 (c)(1),
(2) Date: Nov. 10, 2016

(87) PCT Pub. No.: WO2015/172314
PCT Pub. Date: Nov. 19, 2015

(65) Prior Publication Data
US 2017/0138353 A1    May 18, 2017

(51) Int. Cl.
*F03G 7/04* (2006.01)
*F03G 3/00* (2006.01)
*H02K 7/18* (2006.01)

(52) U.S. Cl.
CPC ............ *F03G 7/04* (2013.01); *F03G 3/00* (2013.01); *H02K 7/1853* (2013.01); *Y02E 10/10* (2013.01)

(58) Field of Classification Search
CPC ..... F03G 7/00; F03G 3/00; F03G 3/02; F03G 2730/00; F03G 13/04; F03G 6/00; F03G 7/04; Y02E 10/10; Y02E 10/12; Y02E 10/125; Y02E 10/14; Y02E 10/16; Y02E 10/18; Y02E 10/46; F24J 3/085; F01K 25/08; F01K 21/005; F01K 3/18; F28C 3/08; F04D 13/04
(Continued)

(56) References Cited

U.S. PATENT DOCUMENTS 5,477,703 A * 12/1995 Hanchar .............. F24J 3/086
165/45
2012/0234005 A1* 9/2012 Smith ................. F03G 7/04
60/641.2

(Continued)

FOREIGN PATENT DOCUMENTS

CN    102235329 A    11/2011
CN    102454560 A    5/2012
(Continued)

*Primary Examiner* — Mark Laurenzi
*Assistant Examiner* — Mickey France
(74) *Attorney, Agent, or Firm* — Muncy, Geissler, Olds & Lowe, P.C.

(57) ABSTRACT

A gravity power generation device comprises a geothermal well, a hollow heat conducting post, a power generating unit, a steam guiding unit, a condensing unit and a water distribution unit. By discharging and filling the water alternately and repetitively, a first tank and a second tank of the power generating unit can be continuously movable back and forth between a first and a second power generation positions so that a shaft of the power generating unit can continuously rotate to drive a generator of the power generating unit to generate electric power, thereby the heat energy of the geothermal steam can be converted into the potential energy of the water, and then be converted to electric energy so as to meet the demand for power generation by natural energy.

10 Claims, 7 Drawing Sheets

(58) Field of Classification Search
USPC ............... 60/641.2, 641.3, 641.5, 641.6, 675
See application file for complete search history.

(56) References Cited

U.S. PATENT DOCUMENTS

2013/0270835 A1* 10/2013 Pingitore .............. F03B 17/005
                                                                                                                      290/1 A
2017/0138353 A1* 5/2017 Liu ........................... F03G 3/00

FOREIGN PATENT DOCUMENTS

| CN | 103527271 A | 1/2014 |
|----|-------------|--------|
| JP | 57183579 A | 11/1982 |
| TW | M399911 U | 3/2011 |
| TW | 201420882 A | 6/2014 |

\* cited by examiner

GRAVITY POWER GENERATION DEVICE USING GEOTHERMAL STEAM

BACKGROUND OF THE INVENTION a) Field of the Invention

The present invention relates to a power generation device, and more particularly to a gravity power generation device which is using geothermal steam.

b) Description of the Prior Art

With the trend of technology development and population growth, the energy consumption is dramatically increasing due to overusement of fossil fuels. It will not only result in the greenhouse effect but also global climate anomalies according to the emissions of a large number of carbon dioxides. Therefore, it is the urgent problem of energy shortage and reducing greenhouse gas emissions to solve for different governments. It is also an imperative issue for human beings to have a sustainable life.

In addition to the development of renewable energy sources, natural energy sources such as solar energy, wind power and hydroelectric power are main issues. In recent years, with the improvement of energy conversion technology, for the skilled persons in the industry began to develop technologies related to recovery of waste heat. It will be a new approach for energy shortage problems.

The so-called "geothermal energy" is derived from the natural heat energy within the crust. Geothermal energy is thermal energy generated and stored in the Earth. Thermal energy is the energy that determines the temperature of matter. The geothermal energy of the Earth's crust originates from the original formation of the planet and from radioactive decay of materials. Because geothermal energy is high temperature and well-abundancy, we can use geothermal energy or the eruption of steam to generate energy for electricity in the current technology. Geothermal energy has been widely developed and utilized in a variety of new alternative energy sources. In the future, if the technology is more advanced, geothermal energy in the deeper crust will be developed further. Therefore, geothermal energy is often so-called the inexhaustible resources.

Referring to FIG. 1, there is a gravity device for generating electricity in Taiwan patent number M399911 which is the pre-filed patent application by inventor in this patent application. The pre-filed patent application discloses a device which use natural energy to generate electricity, comprises a power generating unit 11, a first gravity unit 12, and a second gravity unit 13. The power generating unit 11 includes a generator 111, and a rotating shaft 112 capable of generating electric power by interlocking with the generator 111. The first gravity unit 12 includes a first cable 121 connected to the rotating shaft 112, and a first case 122 connected to the other end of the first cable 121. The second gravity unit 13 including a second cable 131 connected to the rotating shaft 112, and a second case 132 connected to the other end of the second cable 131.

By the design of the first gravity unit 12 and the second gravity unit 13, the total weight of the first and second cases 122 and 132 is changed by water injection and water discharging so as the first and second cases 122 and 132 can be moved up and down. Thereby the first gravity unit 12 is capable of moving between a first power generating position and a second power generating position with respect to the second gravity unit 13 to make the shaft 112 of the power generating unit 11 rotate so as the generator 111 generates electricity. It will meet environmental requirements by converting potential energy to electrical energy.

However, the device which the pre-filed patent application discloses have to be installed in a natural environment such as by sea, river, or waterfall so that the device can generate electricity by hydraulic power. But hydraulic power is more unstable and easily affected by weather in comparison to geothermal energy. Geothermal power generation is known as generating electricity by using geothermal steam to drive the blades of the generator to rotate. It will not be effectively operated if lacking of good heat exchange technology. Generally speaking, geothermal wells easily release toxic gases such as hydrogen sulfide, sulfur dioxide, and other environmental pollution which are harmful to human health. The geothermal steam usually has high percentages of minerals which will be easily accumulated to become obstruction in pipeline and the composition of minerals will cause fouling on the blades of the generator so that the rotation speed will be slow, or even the blades will not rotate to result in low power efficiency. The malfunctioned generator needs to be replaced with new generator so the cost is increased, and the practicality is low and difficult to promote. Accordingly, it is necessary to provide new approaches to generate electricity by effectively using geothermal energy to solve the energy crisis.

SUMMARY OF THE INVENTION

Therefore, an object of the present invention is to provide a gravity power generation device using geothermal steam which can generate electricity by effectively using geothermal energy.

In order to achieve the above mentioned objective, the gravity power generation device comprises a geothermal well, a hollow heat conducting post, a power generating unit, a steam guiding unit, a condensing unit and a water distribution unit. The geothermal well is located below the ground. The hollow heat conducting post is arranged at the bottom of the geothermal well for guiding the geothermal steam into the geothermal well. The power generating unit is disposed at the geothermal well and the power generating unit includes a generator, a shaft connected to the generator, a first cable connected to the shaft, a first tank connected to the first cable, a second cable connected to the shaft, and a second tank connected to the second cable. The first tank has a first exit which is capable of draining water, and a first switch for controlling opening and closing of the first exit. The second tank has a second exit which is capable of draining water, and a second switch for controlling opening and closing of the second exit. The steam guiding unit includes a partition plate arranged at the bottom of the geothermal well and located above the hollow heat conducting post, and a main channel arranged on one side wall of the geothermal well for guiding the geothermal steam. Wherein a steam space is defined by the partition plate and the bottom of the geothermal well and is in communication with the main channel. The condensing unit is connected to the main channel of the steam guiding unit for condensing the geothermal steam guided by the main channel to water. The water distribution unit is connected to the condensing unit to transport water condensed by the condensing unit. Wherein the water distribution unit includes a control valve, a first pipe connected to the control valve, and a second pipe connected to the control valve. The control valve is capable of controlling opening and closing of the first pipe and the second pipe such that water from the first pipe is injected into the first tank when the first pipe is opened and water from the second pipe is being stopped injecting into the second tank when the second pipe is closed, or water from the first pipe is being stopped injecting into the first tank when the first pipe is closed and water from the second pipe is injected into the second tank when the second pipe is opened. Wherein the first tank and the second tank are movable between a first power generation position and a second power generation position. The weight of the first tank containing water is greater than the weight of the second tank so that the second tank is located above the first tank and the second cable is wound on the shaft when at the first power generation position. The weight of the second tank containing water is greater than the weight of the first tank so that the first tank is located above the second tank and the first cable is wound on the shaft when at the second power generation position.

The advantage of the present invention is to reduce the excavation depth of the geothermal well, to reduce the installation cost, to simplify the construction, and to improve the convenience of work by extending the hollow heat conducting post into the ground. The geothermal steam in the steam space will be guided along the partition plate into the main channel to improve the efficiency of collecting the geothermal steam. The condensing unit is configured to condense the geothermal steam into the water which will be injected into the first tank and the second tank via the first pipe and the second pipe. Sequentially, by discharging and filling the water alternately and repetitively, the first tank and the second tank can be continuously movable back and forth between the first and second power generation positions so that the shaft can continuously rotate to drive the generator to generate electric power, thereby the heat energy of the geothermal steam can be converted into the potential energy of the water, and then be converted to electric energy so as to meet the demand for power generation by natural energy.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENT

Specific structural and functional details disclosed herein will become apparent from the following description of the preferred embodiments of the present invention taken in conjunction with the accompanying drawings.

Before explaining the present method in detail, it is to be understood that similar elements are labeled with the same number.

Figure 1:
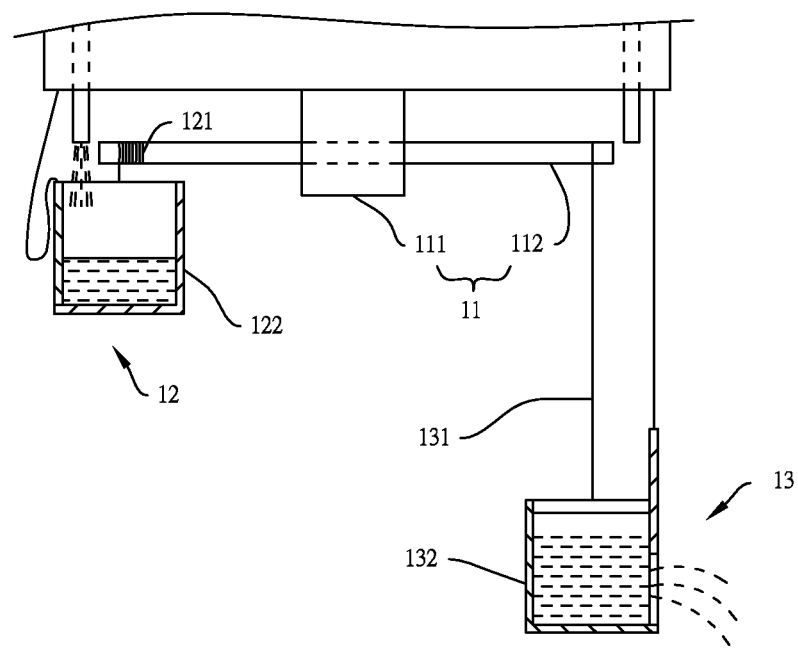
FIG. 1 is a fragmentary schematic cross-sectional view of a gravity power generation device disclosed by Taiwan patent number M399911.
Figure 2:
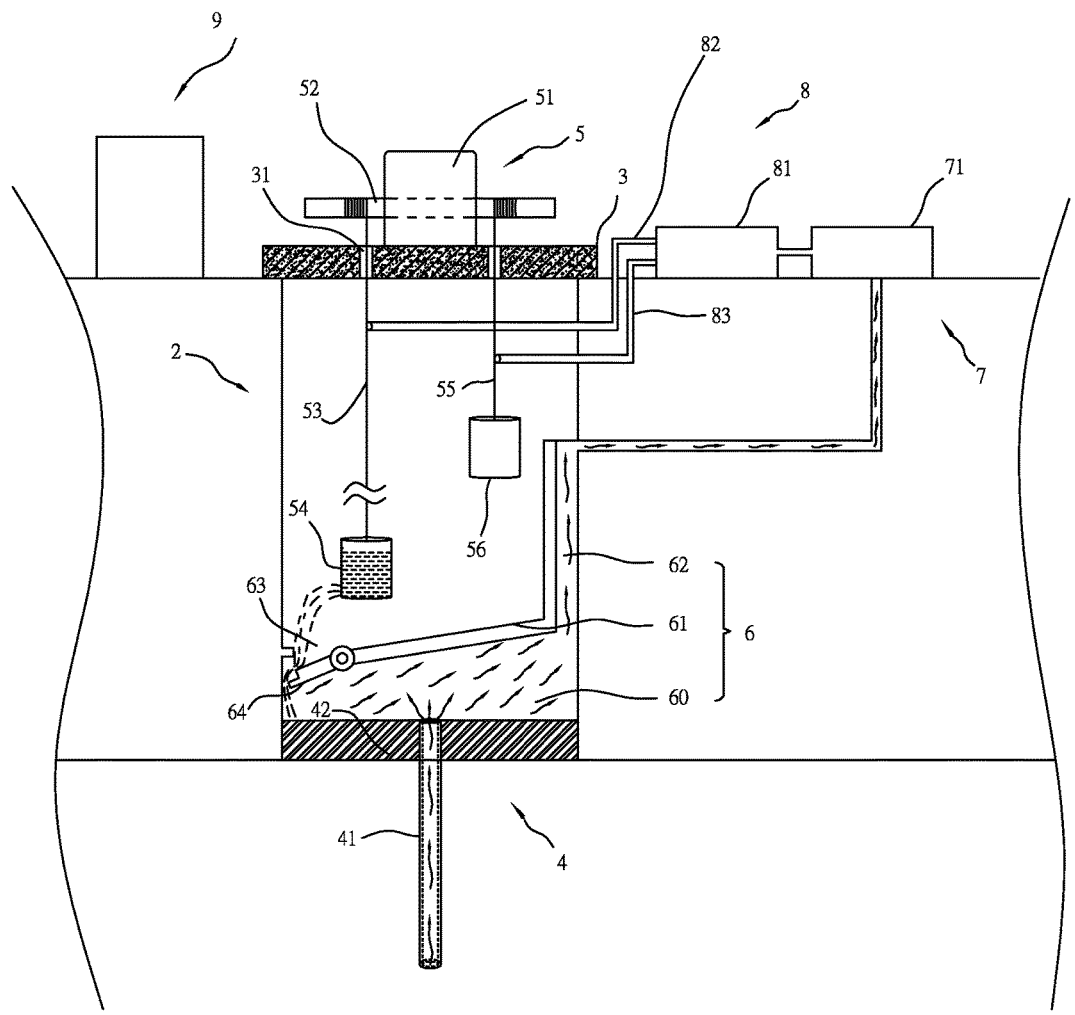
FIG. 2 is a fragmentary schematic cross-sectional view of a gravity power generation device using geothermal steam according to a first embodiment of the present invention.
Figure 3:
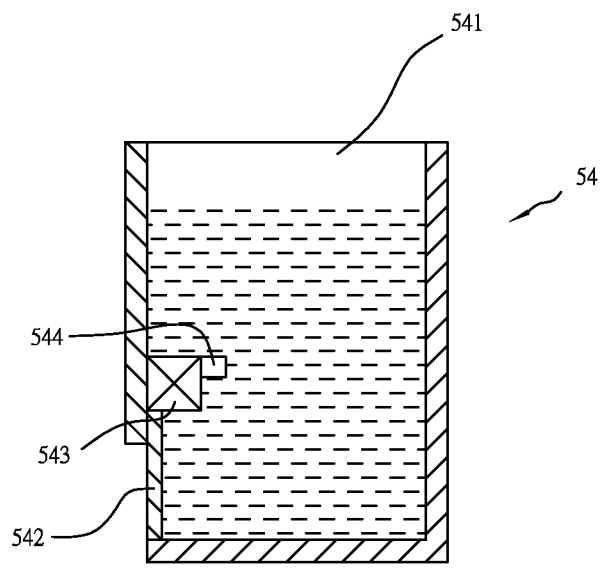
FIG. 3 is an enlarged fragmentary schematic cross-sectional view of the first embodiment according to the present invention, but only showing a first tank.
Figure 4:
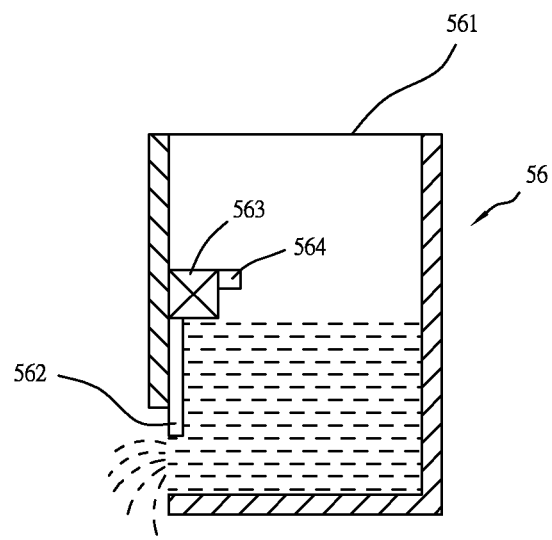
FIG. 4 is an enlarged fragmentary schematic cross-sectional view of the first embodiment according to the present invention, but only showing a second tank.

Referring to FIGS. 2, 3 and 4, a gravity power generation device using geothermal steam in accordance with a first embodiment of the present invention is shown. The gravity power generation device comprises a geothermal well 2, a cover 3, a hollow heat conducting post 4, a power generating unit 5, a steam guiding unit 6, a condensing unit 7, a water distribution unit 8, and a power storage unit 9.

In the first embodiment, the geothermal well 2 is disposed in a region having geothermal heat and is drilled down to a predetermined depth from the ground. The depth of the drilling will vary according to the geographical environment. The top of the geothermal well 2 is covered by the cover 3, and the cover 3 is provided with two through holes 31. It is noted that the cover 3 is made of cement. The cover 3 can avoid foreign objects or humans accidentally fall into the geothermal well 2 to enhance the safety of the geothermal well 2.

The hollow heat conducting post 4 is arranged at the bottom of the geothermal well 2 for guiding the geothermal steam into the geothermal well 2. Wherein the hollow heat conducting post 4 comprises a body 41 extended into the ground, and a heat conductor 42 disposed on the body 41 and exposed within the geothermal well 2. The hollow heat conducting post 4 is made of a high heat conductivity material such as metal.

The geothermal steam under the ground can be conducted to the geothermal well 2 via the body 41 extended into the ground. Similarly, the heat conductor 42 also transmits the geothermal steam under the ground to the geothermal well 2. That will accelerate the conduction of geothermal efficiency. As a result, it is possible to reduce the excavation depth of the geothermal well 2, to reduce the installation cost, to simplify the construction, and to improve the convenience of work.

The power generating unit 5 includes a generator 51, a shaft 52 connected to the generator 51, a first cable 53 connected to the shaft 52, a first tank 54 connected to the first cable 53, a second cable 55 connected to the shaft 52, and a second tank 56 connected to the second cable 55.

The shaft 52 drives the generator 51 to generate electric power. One end of the first cable 53 is connected to the shaft 52 and the other end of the first cable 53 is connected to the first tank 54. One end of the second cable 55 is connected to the shaft 52 and the other end of the second cable 55 is connected to the second tank 56. The first cable 53 and the second cable 55 pass through the two through holes 31 of the cover 3 respectively to be fixed at the first tank 54 and the second tank 56.

It should be noted here that the substantial lengths of the first cable 53 and the second cable 55 connected to the shaft 52 are the same. When the shaft 52 rotates, the first cable 53 and the second cable 55 are wound on the shaft 52 in two opposite directions. In addition, the first tank 54 and the second tank 56 are made of a material which is resistant to high temperatures.

The first tank 54 has a first top opening 541, a first exit 542 which is capable of draining water, a first switch 543 for controlling opening and closing of the first exit 542, and a first timer 544 disposed on the first switch 543 to control the actuation of the first switch 543.

The second tank 56 has a second top opening 561, a second exit 562 which is capable of draining water, a second switch 563 for controlling opening and closing of the second exit 562, and a second timer 564 disposed on the second switch 563 to control actuation of the second switch 563.

Since the first switch 543 and the second switch 563 are solenoid valves and the first timer 544 and the second timer 564 are electronic components capable of controlling the actuation of the first switch 543 and the second switch 563, the first switch 543 and the second switch 563 can be automatically control the first exit 542 and the second exit 562 to open and close by specific time to ensure the stability of the operation.

Specifically, the first top opening 541 and the second top opening 561, the first exit 542 and the second exit 562, the first switch 543 and the second switch 563, and the first timer 544 and the second timer 564 can be designed to kinds of types that are intended to release water contained in the first tank 54 and the second tank 56 and to control opening and closing of the first and second water discharge openings and the first exit 542 and the second exit 562. Thus it should not be limited to the disclosure of this first embodiment.

In addition, the first embodiment discloses one generator 51 and one shaft 52 rotatably and horizontally inserted in the generator 51. It can also provide two generators 51 separately located at both ends of the shaft 52 in practical use. Thus, it should not be limited to the disclosure of this first embodiment.

The steam guiding unit 6 includes a partition plate 61 arranged at the bottom of the geothermal well 2 and located above the hollow heat conducting post 4, and a main channel 62 arranged on one side wall of the geothermal well 2 for guiding the geothermal steam. Wherein a steam space 60 is defined by the partition plate 61 and the bottom of the geothermal well 2 and is in communication with the main channel 62.

The partition plate 61 is slantly disposed in the geothermal well 2, and the high-end of the partition plate 61 is connected to the main channel 62. The geothermal steam in the steam space 60 is guided along the partition plate 61 into the main channel 62, thereby improving the efficiency of collecting the geothermal steam.

In addition, the steam guiding unit 6 further includes an inlet 63 provided at the low-end of the partition plate 61, and a block 64 for the inlet 63 to restrain steam in the steam space 60 from flowing out. The block 64 only opens in one-direction so that water in the geothermal well 2 can flow into the steam space 60 while the geothermal steam in the steam space 60 cannot flow out of the partition plate 61. The different types of blocks 64 may be provided depending on the needs in practical use and it should not be limited to the disclosure of this first embodiment.

The condensing unit 7 is connected to the main channel 62 of the steam guiding unit 6 for condensing the geothermal steam guided by the main channel 62 to water. The condensing unit 7 comprises a heatsink 71 disposed on the steam guiding unit 6. The heatsink 71 is fins type in this first embodiment or watercooling type in other embodiments.

The water distribution unit 8 is connected to the condensing unit 7 to transport water condensed by the condensing unit 7. Wherein the water distribution unit 8 includes a control valve 81, a first pipe 82 connected to the control valve 81, and a second pipe 83 connected to the control valve 81. The control valve 81 is capable of controlling opening and closing of the first pipe 82 and the second pipe 83. The exit of the first pipe 82 is located above the first tank 54. The exit of the second pipe 83 is located above the second tank 56.

Since the first pipe 82 and the second pipe 83 are opened and closed under the control of the control valve 81, the second pipe 83 stops water injection when water is injected from the first pipe 82, in the contrary, the first pipe 82 stops water injection when water is injected from the second pipe 83.

In the first embodiment, the condensing unit 7 and the water distribution unit 8 are installed on the ground. The condensing unit 7 and the water distribution unit 8 may be disposed below the ground according to the installation position and demand in actual practice, and it should not be limited to the disclosure of this first embodiment.

The power storage unit 9 is installed on the ground and electrically connected to the power generating unit 5 for storing and outputting electric power generated by the generator 51 of the power generating unit 5. The electric power stored in the power storage unit 9 can be served as a stable power output and be widely used in sectors of industry, agriculture, commerce, and family or other sectors.

In practice use, the geothermal steam can be quickly conducted into the steam space 60 by means of the hollow heat conducting post 4 provided at the bottom of the geothermal well 2, and guided into the main channel 62 along the partition plate 61. At this time, the geothermal steam will be condensed into water by the condensing unit 7 connected to the main channel 62. The condensed water enters the first pipe 82 and the second pipe 83 of the water distribution unit 8 along the main channel 62. The first pipe 82 and the second pipe 83 are controlled by the control valve 81 to open and close so that the condensed water can be injected into the first tank 54 and the second tank 56 respectively. With the weight difference between the first tank 54 and the second tank 56 when water in injected, the first tank 54 and the second tank 56 are movable between a first power generation position and a second power generation position, i.e., the first tank 54 and the second tank 56 are movable up and down.

The weight of the first tank 54 containing water is greater than the weight of the second tank 56 so that the second tank 56 is located above the first tank 54 and the second cable 55 is wound on the shaft 52 when at the first power generation position.

When the first timer 544 on the first tank 54 is triggered at the time which is set up in advanced, the first switch 543 controls the first exit 542 to open to discharge the water contained in the first tank 54. On the contrary, when the first timer 544 on the first tank 54 is triggered at the close time which is set up in advanced, the first switch 543 controls the first exit 542 to close. The control valve 81 opens the second pipe 83 so that water can be injected from the second top opening 561 into the second tank 56 after the discharging in the first tank 54 is completed.

Likewise, the weight of the second tank 56 containing water is greater than the weight of the first tank 54 so that the first tank 54 is located above the second tank 56 and the first cable 53 is wound on the shaft 52 when at the second power generation position.

When the second timer 564 on the second tank 56 is triggered at the open time which is set up in advanced, the second switch 563 controls the second exit 562 to open to discharge the water contained in the second tank 56. On the contrary, when the second timer 564 on the second tank 56 is triggered at the close time which is set up in advanced, the second switch 563 controls the second exit 562 to close. The control valve 81 opens the first pipe 82 so that water can be injected from the first top opening 541 into the first tank 54 after the discharging in the second tank 56 is completed.

By discharging and filling the water alternately and repetitively, the first tank 54 and the second tank 56 can be continuously movable back and forth between the first and second power generation positions so that the shaft 52 can continuously rotate to drive the generator 51 to generate electric power, thereby the heat energy of the geothermal steam can be converted into the potential energy of the water, and then be converted to electric energy so as to meet the demand for power generation by natural energy.

In the first embodiment, the first tank 54 and second tank 56 are designed as to contain one ton of water. By the gravitational acceleration of the first tank 54 and the second tank 56, the instant power generation amount is increased to enhance the power generation efficiency. The first tank 54 and the second tank 56 may be different capacity according to the demand in actual practice, and it should not be limited to the disclosure of this first embodiment.

Because the geothermal steam contains high percentages of minerals, even the geothermal steam in specific regions is a strong acid, will lead to corrosion of metal equipment and be easily accumulated to become obstruction in pipeline if using for a long time. It will result in reducing power generation efficiency and need to be replaced with a new equipment. In the present case, the geothermal steam is guided into the main channel 62 along the partition plate 61, then is condensed into water by the condensing unit 7. Thus the geothermal steam does not directly erode the power generating unit 5. It will not have problems of short endurance.

Referring to FIG. 2, the water drained from the first tank 54 and the second tank 56 enters the steam space 60 via the inlet 63 and contacts with the heat conductor 42 disposed within the geothermal well 2. The high temperature of the heat conductor 42 will make the water vaporize and become the steam that can be guided along the partition plate 61 into the main channel 62 for recycling.

Figure 5:
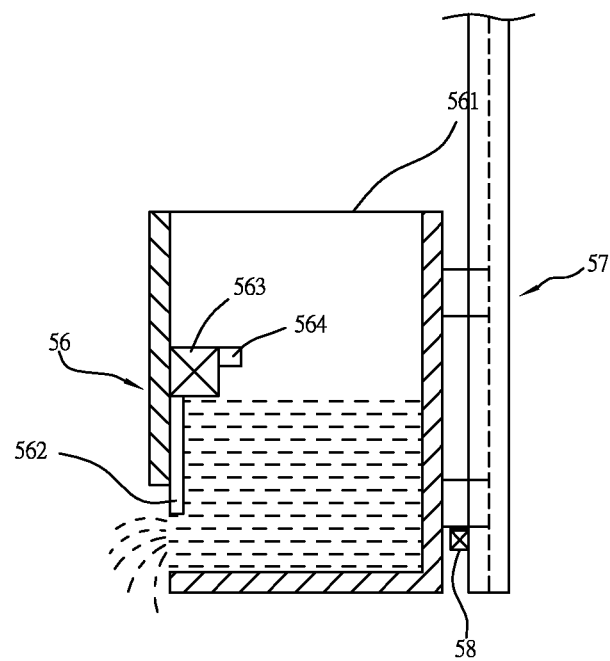
FIG. 5 is a schematic cross-sectional view of a gravity power generation device using geothermal steam according to a second embodiment of the present invention, but only showing a rail and a trigger member.
Figure 6:
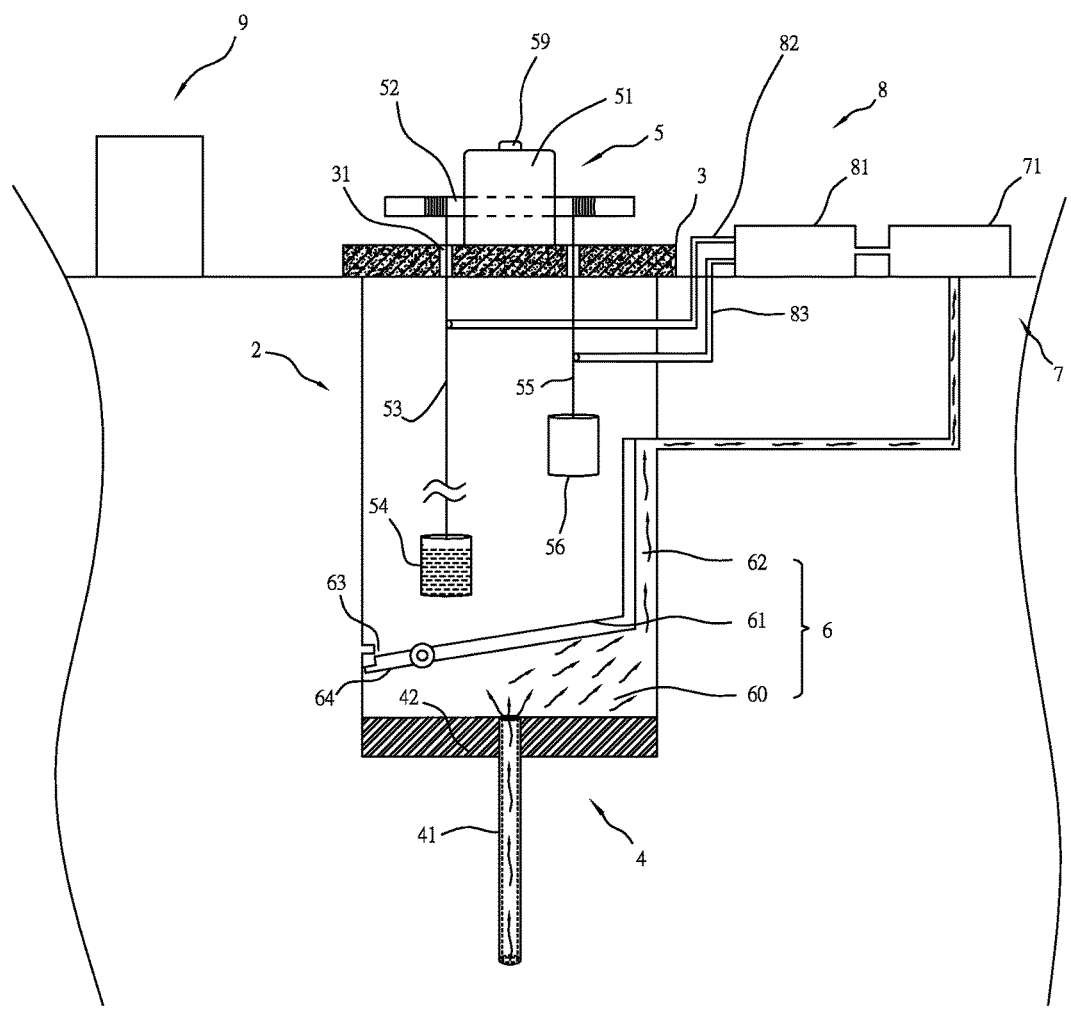
FIG. 6 is a fragmentary schematic cross-sectional view of the gravity power generation of the second embodiment of the present invention.

Referring to FIGS. 5 and 6, a gravity power generation device using geothermal steam in accordance with a second embodiment of the present invention is shown. The second embodiment is generally identical to the first embodiment, and only differs in that, in the second embodiment, the power generating unit 5 further includes two rails 57 respectively provided in the geothermal well 2 and connected to the first tank 54 and the second tank 56 for moving up and down along therewith, and two trigger members 58 respectively provided at ends of the two rails 57. There is only one rail 57 and trigger member 58 shown in the FIG. 5 because of view angle. In the second embodiment, the two trigger members 58 are contact switches and capable of transmitting signal to the first switch 543 and the second switch 563.

The first tank 54 and the second tank 56 are movable up and down along the two rails 57. When the first tank 54 and the second tank 56 move to the end of the two rails 57, the two trigger members 58 are in contact of the first tank 54 and the second tank 56 and activate the first switch 543 and the second switch 563 to open the first exit 542 and the second exit 562 respectively. Accordingly, the water previously injected into the first tank 54 and the second tank 56 can discharged.

The first tank 54 and the second tank 56 can be smoothly and reciprocally up and down between the first and second power generating positions by the arrangement of the two rails 57. Thus, the movement stability of the first tank 54 and the second tank 56 can be improved. The two trigger members 58 respectively provided at ends of the two rails 57 allows the water containing in the first tank 54 and the second tank 56 to drain into the geothermal well 2.

In addition, in the second embodiment, the power generating unit 5 further includes a brake 59 which is interlocked with the shaft 52 and capable of stopping the first tank 54 and the second tank 56 falling.

When the rotating speed of the shaft 52 is higher than the preset speed, the brake 59 is started to exert a braking force to let the shaft 52 slow down. The falling speed of the first tank 54 and the second tank 56 will be decreased to provide a cushioning force or buffer force when the first tank 54 and the second tank 56 fall down. The overall device can be prevented from being damaged by strong external forces. Since there are many types of the brake 59 and the amount may be not limited to one, it should not be limited to the disclosure of the second embodiment.

Figure 7:
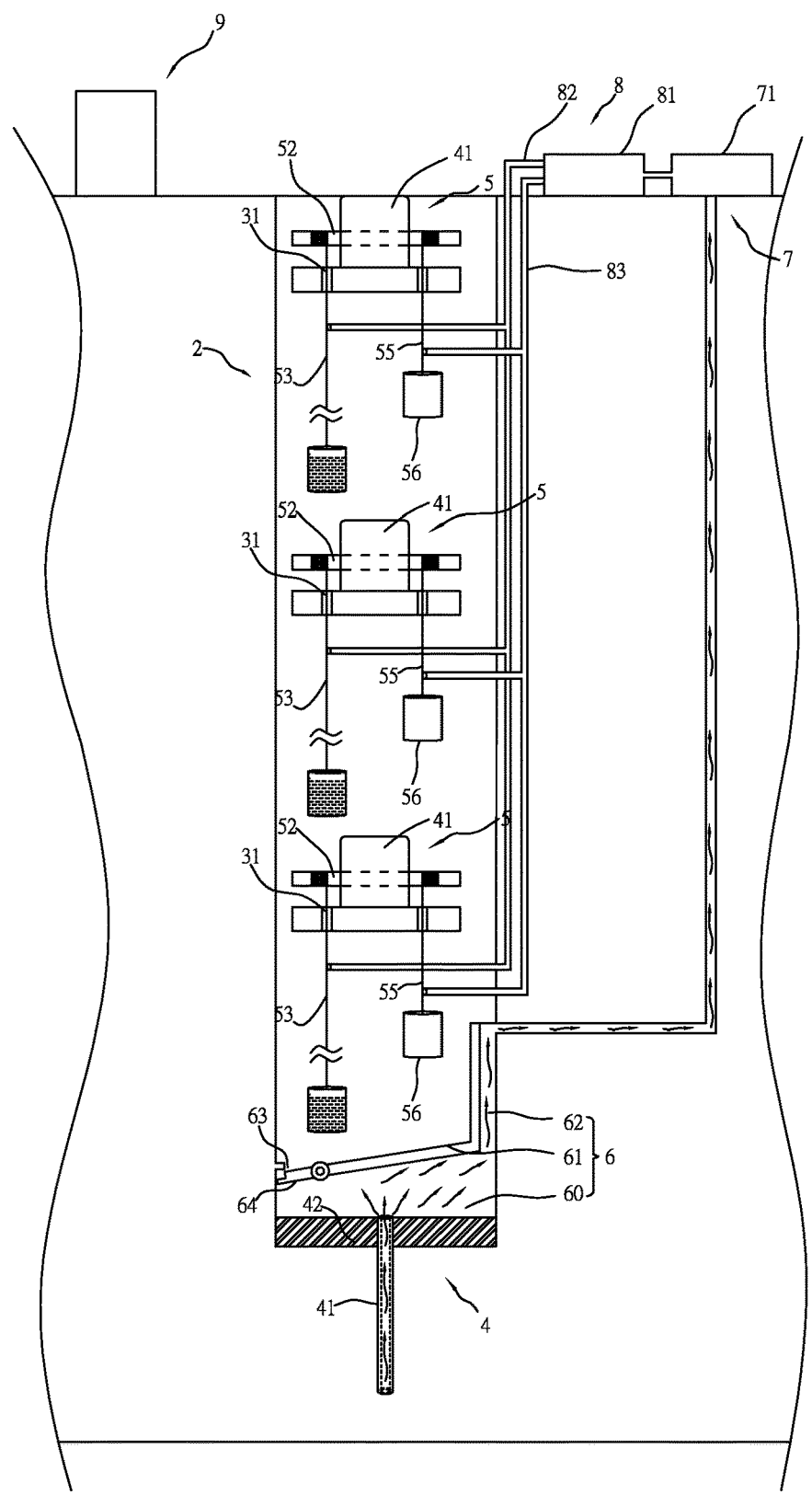
FIG. 7 is a fragmentary schematic cross-sectional view of a gravity power generation device using geothermal steam according to a third embodiment of the present invention.

Referring to FIG. 7, a gravity power generation device using geothermal steam in accordance with a third embodiment of the present invention is shown. The third embodiment is generally identical to the second embodiment, and only differs in that, in the third embodiment, the gravity power generation device further includes a plurality of power generating units 5 provided in the geothermal well 2.

In the third embodiment, the plurality of power generating units 5 provided in the geothermal well 2 are disposed in different stages so that the first cable 53 and the second cable 55 which are connected to the first tank 54 and the second tank 56 can be shortened to reduce the distance of reciprocating movement of the first tank 54 and the second tank 56 between the first and second power generation positions. At the same time, it can also increase the power generation efficiency of the generator 51 by increasing the numbers of the power generating units 5.

The third embodiment is to provide another arrangement for guiding the geothermal steam in the geothermal well 2 by using the main channel 62 in comparison to the second embodiment. The arrangement for guiding the geothermal steam is also possible to change the setting manner or way according to the demands in actual practice, and it should not be limited to the disclosure of this third embodiment.

The well-abundancy of geothermal energy and its potential for power generation is recognized by the academic community. Geothermal energy has long life as the earth and almost no risk of depletion. The conventional geothermal power generation method utilizes the power of geothermal steam when erupting to drive the blades rotate to generate power and its power generating capacity is limited. This invention can generate electricity by utilizing the geothermal energy to condense the steam into the water and then using the potential energy of the water to drive the generator 51. Therefore, the amount of electric power generated by the generator 51 is maximized and always much larger than that of the conventional power generation. The amount of electric power is even getting larger in the case of gravity power generation because the shaft 52 will be rapidly rotated by the gravitational acceleration along with the movement of the first tank 54 and the second tank 56. The potential of power generation according to this invention can not be underestimated.

In sum, by disposing the geothermal well 2, the cover 3, the hollow heat conducting post 4, the power generation unit, the steam guiding unit 6, the condensing unit 7, the water distribution unit 8, and the power storage unit 9, wherein the hollow heat conducting post 4 is extended into the ground, thereby the efficiency of conduction of geothermal heat will be increased to decrease the excavation depth of the geothermal well 2, the installation cost will be reduced, the construction will be simplified, and the convenience of work will be improved. The partition plate 61 installed obliquely in the geothermal well 2 will guide the geothermal steam into the main channel 62 to enhance the efficiency of the collection of the geothermal steam.

By discharging and filling the water alternately and repetitively, the first tank 54 and the second tank 56 can be continuously movable back and forth between the first and second power generation positions so that the shaft 52 can continuously rotate to drive the generator 51 to generate electric power, thereby the heat energy of the geothermal steam can be converted into the potential energy of the water, and then be converted to electric energy so as to meet the demand for power generation by natural energy without releasing toxic substances and other environmental pollution which are harmful to human health. It is indeed to achieve the object of the present invention.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A gravity power generation device using geothermal steam, the gravity power generation device comprising:
    a geothermal well located below the ground;
    a hollow heat conducting post arranged at bottom of the geothermal well for guiding the geothermal steam into the geothermal well;
    a power generating unit disposed at the geothermal well, and the power generating unit including:
    a generator;
    a shaft connected to the generator;
    a first cable connected to the shaft;
    a first tank connected to the first cable, wherein the first tank has a first exit which is capable of draining water, and a first switch for controlling opening and closing of the first exit;
    a second cable connected to the shaft; and
    a second tank connected to the second cable, wherein the second tank has a second exit which is capable of draining water, and a second switch for controlling opening and closing of the second exit;
    a steam guiding unit including a partition plate arranged at the bottom of the geothermal well and located above the hollow heat conducting post, and a main channel arranged on one side wall of the geothermal well for guiding the geothermal steam, wherein a steam space is defined by the partition plate and the bottom of the geothermal well and is in communication with the main channel;
    a condensing unit connected to the main channel of the steam guiding unit for condensing the geothermal steam guided by the main channel to water; and
    a water distribution unit connected to the condensing unit to transport water condensed by the condensing unit, wherein the water distribution unit includes a control valve, a first pipe connected to the control valve, and a second pipe connected to the control valve, wherein the control valve is capable of controlling opening and closing of the first pipe and the second pipe such that water from the first pipe is injected into the first tank when the first pipe is opened and water from the second pipe is being stopped injecting into the second tank when the second pipe is closed, or water from the first pipe is being stopped injecting into the first tank when the first pipe is closed and water from the second pipe is injected into the second tank when the second pipe is opened;
    wherein the first tank and the second tank are movable between a first power generation position and a second power generation position;
    wherein a weight of the first tank containing water is greater than a weight of the second tank so that the second tank is located above the first tank and the second cable is wound on the shaft when at the first power generation position; and
    wherein a weight of the second tank containing water is greater than a weight of the first tank so that the first tank is located above the second tank and the first cable is wound on the shaft when at the second power generation position.

2. The gravity power generation device using geothermal steam as claimed in claim 1, wherein the partition plate is slantly disposed in the geothermal well, and a high-end of the partition plate is connected to the main channel.

3. The gravity power generation device using geothermal steam as claimed in claim 2, wherein the steam guiding unit further includes an inlet provided at a low-end of the partition plate, and a block for the inlet to restrain steam in the steam space from flowing out.

4. The gravity power generation device using geothermal steam as claimed in claim 3, wherein the power generating unit further includes two rails respectively provided in the geothermal well and connected to the first and second tanks for moving up and down along therewith.

5. The gravity power generation device using geothermal steam as claimed in claim 4, wherein the power generating unit further includes two trigger members respectively provided at ends of the two rails, and the two trigger members are triggered to open the first exit and the second exit correspondingly so that water in the first tank and in the second tank will be discharged when the first and second tanks move to the ends of the two rails.

6. The gravity power generation device using geothermal steam as claimed in claim 5, further including a power storage unit for storing and outputting electric power generated by the power generation unit.

7. The gravity power generation device using geothermal steam as claimed in claim 6, wherein the condensing unit includes a heatsink disposed on the steam guiding unit.

8. The gravity power generation device using geothermal steam as claimed in claim 7, wherein the hollow heat conducting post includes a body extended into the ground, and a heat conductor disposed on the body and exposed within the geothermal well.

9. The gravity power generation device using geothermal steam as claimed in claim 3, wherein the first tank further has a first timer disposed on the first switch to control actuation of the first switch, and the second tank further has a second timer disposed on the second switch to control actuation of the second switch.

10. The gravity power generation device using geothermal steam as claimed in claim 8, further including a plurality of power generating units provided in the geothermal well.

* * * * *